United States Patent [19]
Leonardi

[11] Patent Number: 4,719,039
[45] Date of Patent: Jan. 12, 1988

[54] ELECTRICALLY CONDUCTIVE POLYETHYLENE FOAM

[75] Inventor: Nicholas J. Leonardi, North Andover, Mass.

[73] Assignee: Dynamit Nobel of America, Inc., Rockleigh, N.J.

[21] Appl. No.: 857,301

[22] Filed: Apr. 30, 1986

Related U.S. Application Data

[63] Continuation of Ser. No. 688,413, Jan. 2, 1985, abandoned.

[51] Int. Cl.$^4$ .......................... C08J 9/06; H01B 1/06
[52] U.S. Cl. .................................. 252/511; 264/45.3; 264/54; 264/105; 264/DIG. 18; 521/79; 521/81; 521/82; 521/134; 521/143; 521/149
[58] Field of Search .................. 521/134, 143, 79, 82, 521/81

[56] References Cited

U.S. PATENT DOCUMENTS

| | | | |
|---|---|---|---|
| 4,275,168 | 6/1981 | Watanabe et al. | 521/82 |
| 4,431,575 | 2/1984 | Fujie et al. | 521/94 |
| 4,493,788 | 1/1985 | Fujie et al. | 521/143 |
| 4,519,963 | 5/1985 | Yoshida et al. | 521/79 |

*Primary Examiner*—Morton Foelak
*Attorney, Agent, or Firm*—Antonelli, Terry & Wands

[57] ABSTRACT

An electrically conductive polyethylene foam which is in the form of a profile, e.g. a sheet, having a closed cell foam structure and exhibiting a surface resistivity of not more than $10^5$ ohms/square. The sheet is prepared by a continuous method wherein an extruded, foamable, non-crosslinked preform containing a mixture of polyethylene, ethylene copolymer, chemical blowing agent, crosslinking agent and conductive carbon black is heated to produce the foam.

10 Claims, 3 Drawing Figures

ELECTRICALLY CONDUCTIVE POLYETHYLENE FOAM

This is a continuation of application Ser. No. 688,413, filed Jan. 2, 1985 now abandoned.

This invention relates to an extruded, crosslinked polyethylene foam which is electrically conductive, an electrically conductive shaped article formed therefrom, a foamable polyethylene-containing composition, and a method for producing the foam wherein an extruded non-crosslinked preform is prepared by extrusion of a foamable composition comprising a resinous mixture containing carbon black and crosslinking and blowing agents and wherein the preform is thereafter heated to effect crosslinking and foaming of the composition.

For the past several years, the users and manufacturers of communication equipment, photographic processing equipment, electronic devices and the like have become aware of the need to protect their equipment and devices from the adverse effects of static electricity, especially electrostatic discharge (ESD). In order to satisfy this need, a new industry has developed; namely the static control industry, and many different products for controlling static electricity are now commercially available. Among such products are electrically conductive foams of polyurethane and polyolefins such as polyethylene which may be used to provide both physical and electrostatic protection for sensitive electronic parts; mats, films, and sheets of synthetic resins, such as polyesters, containing conductive additives for providing working and walking surfaces that will dissipate static electricity as well as static shielding bags formed from metallic coated synthetic resin, e.g., a polyester, which may be used to provide Faraday Cage Protection for electronic components encased within the bags. Also various carriers such as boxes, trays, parts bins and the like, have been made from conductive plastics and reinforced conductive plastics. Such products require the use of different synthetic resins and often require rather elaborate procedures for producing products having the necessary flexibility, impact resistance, structural rigidity and tensile strength suitable for each intended application.

In order to provide guidelines for establishing and implementing an Electrostatic Discharge Control Program in accordance with DOD-STD-1686, the Department of Defense of the United States has published a handbook entitled "Electrostatic Discharge Control Handbook for Protection of Electrical and Electronic Parts Assemblies, and Equipment (Excluding Electrically-Initiated Explosive Devices)" which is identified as DOD-HDBK-263, May 2, 1980. On pages 2 and 3 of the handbook the following definitions are given:

"Anti-static Material. ESD protective material having a surface resistivity greater than $10^9$, but not greater than $10^{14}$ ohms per square.

Conductive Material. ESD protective material having a surface resistivity of $10^5$ ohms per square maximum.

Insulative Material. Material having surface resistivities greater than $10^{14}$ ohms per square."

An object of the present invention is to develop an electrically conductive foam which can be used to provide many different static controlling products.

Yet another object of the present invention is to provide a foamable electrically conductive preform by extrusion in the form of a sheet which can be readily fabricated into shaped articles by conventional molding techniques.

Still another object of the invention is to provide a method of producing the crosslinked, electrically conductive polyethylene foam which is continuous and which comprises compounding, extruding, shaping, and cooling to provide a foamable and crosslinkable preform and heating the preform to activate the crosslinking and blowing agents sequentially thereby forming the foam product.

This invention contemplates an electrically conductive, crosslinked extruded polyethylene foam having a density of from 2 to 12 pounds per cubic foot (PCF) and a surface resistivity of not more than $10^5$ ohms/square and preferably of not more than $10^4$ ohms/square. In addition to its outstanding electrical conductivity, the crosslinked polyethylene foam of this invention exhibits high tensile strength and elongation at break, very low water absorption and excellent flexibility thereby providing a foam material that is readily thermoformable into simple and complex shapes by a variety of conventional fabrication techniques including vacuum forming and compressed air forming, that is thermally weldable, and that is capable of being cemented or laminated with itself or other materials, for example, synthetic resins, paper, metal, etc.

The electrically conductive crosslinked polyethylene foam of this invention is produced from a preform of a foamable composition that contains low-density polyethylene and/or, a copolymer of ethylene and an ethylenically unsaturated monomer copolymerizable with the ethylene; for example, vinyl acetate, propylene, butene, butadiene, acrylic acid, etc., with vinyl acetate being the preferred monomer since the ethylene/vinyl acetate copolymer is particularly effective in reducing brittleness and imparting improved flexibility and moldability to the resulting foam especially a foam prepared from an admixture of polyethylene and an ethylene/vinylacetate copolymer.

In general, the foamable composition comprises 100 parts by weight of a resinous material (hereinafter simply referred to as resin) containing 0 to 100%, preferably about 20–80% by weight and more preferably 40–60% by weight of at least one low-density polyethylene and 100 to 0%, preferably 80–20% by weight, and more preferably 60–40% by weight, of at least one of ethylene copolymer, especially an ethylene/vinyl acetate copolymer, and 12–25 parts by weight of conductive carbon black, 0.5 to 1.5 parts by weight of a crosslinking agent and 2 to 15 parts by weight of a blowing agent per 100 parts by weight of the resinous material. The low-density polyethylene has a specific gravity of from 0.91 to 0.93 (as determined by ASTM D-1505-68) and a melt index of from 10 to 40 and preferably from 15 to 30 (as determined by ASTM D-1238-79). Also mixtures of low-density polyethylenes having different melt indices within the above designated range may be used alone or admixed with the copolymer.

The ethylene copolymer used in the foamable composition of the present invention should also exhibit a melt index of from 10 to 40, preferably 20 to 25, and should have an ethylene content of at least 60% by weight. With a copolymer of ethylene and vinyl acetate, the content of vinyl acetate should be from 5 to 40% by weight and preferably from 15 to 30% by weight. The homopolymers and copolymers of ethylene suitable for the present invention are commercially available and are produced by well-known conventional polymerization methods.

The crosslinking agent utilized in the foamable composition are organic peroxides such as dicumyl peroxide, di-tert-butyl peroxide, 2,5-dimethyl-2,5-di(tert-butyl peroxy) hexane, tert-butyl hydroperoxide, cumyl-tert-butyl peroxide and the like. Among these crosslinking agents, it is necessary to select the crosslinking agent which thermally decomposes at a lower temperature than the decomposition temperature of the blowing agent to be used. Also it will be recognized that the quantity of the crosslinking agent used depends upon the specific type of resinous admixture and the blowing agent and the quantity of the blowing agent. Generally, the crosslinking agent is used in a quantity of from 0.5 to 1.5 parts by weight per 100 parts of the resin and preferably from 0.85 to 1.0 parts by weight of the crosslinking agent per 100 parts by weight of the resin is utilized. Dicumyl peroxide which is the preferred crosslinking agent has a decomposition temperature of about 170°, at which crosslinking commences.

The blowing agent used in the present invention is a chemical blowing agent used to control the density of the foam and has a decomposition temperature higher than the softening point of the resin and also higher than the decomposition temperature of the crosslinking agent in the foam composition. The blowing agent is usually used in an amount of from 2 to 15 parts per 100 parts by weight of the resin and preferably is used in an amount of from 5 to 10 parts by weight per 100 parts of the resin. Suitable chemical blowing agents include azodicarbonamide, dinitrosopentamethylene tetramine, barium azodicarboxylate, hydroazodicarbonamide, p-toluene sulfonyl semi-carbazide, trihydrazine triazine and the like. The preferred chemical blowing agent is azodicarbonamide which has a decomposition temperature above 190° C. that is higher than that of the preferred crosslinking agent.

It will be appreciated that customary additives ordinarily employed in the formation of polyethylene foams, for example, light-protection agents, pigments, fillers, flame retardants, mold release agents, lubricants, or the like, may be added to the composition prior to formation of the non-crosslinked foamable preform.

The electrically conductive polyethylene foam of this invention is produced by a continuous method wherein the resin, that is the ethylene polymers, the conductive carbon black, the crosslinking agent and the chemical blowing agent are compounded together and the resin is plasticized within an extruder unit; the resulting plasticized admixture is extruded from the extruder at a temperature that is below the decomposition temperatures of the crosslinking agent and the blowing agent and that is above the melting point of the resin to provide a non-crosslinked, non-foamed preform or matrix material usually in the form of a sheet; the sheet is sized or calibrated between a pair of rollers to have a uniform thickness; the sheet is cooled by the ambient air and the cooled preform is passed through a multi-zone heating oven to effect crosslinking and foaming. In the first zone of the oven the sheet is heated to a first temperature, e.g. from 175°-200° C., to activate the crosslinking agent (about 70 to 80% of the crosslinking agent is reacted). Then in the second zone the sheet is raised to a second temperature higher than the first temperature to complete the crosslinking and to initiate foaming, e.g. a temperature of from 200° C. to 220° C. Finally, in the third zone of the oven the sheet is heated to a third temperature which is higher than that of the second zone to complete the foaming of the resin, e.g. a temperature of from 220° C. to 240° C. The resulting crosslinked foam product is taken from the oven, cooled with water, for example, water cooled chrome rolls, and then passed to a take-up roll for storage.

The ethylene polymers in the foam product normally are not fully crosslinked and the extent or degree of crosslinking is from 65% to 80%, preferably 70% to 75% in order to provide a foam that is flexible and that can be readily fabricated into shaped articles such as boxes, trays and the like by vacuum-forming.

Advantageously, the non-resinous additives, i.e. conductive carbon black, crosslinking agent and blowing agent each are premixed and formed into small pellets containing resin, e.g. polyethylene and/or ethylene copolymer and the required amount of additive prior to compounding within the extruder. This practice reduces the problems of air pollution at the extruder site, facilitates metering of the foam components or ingredients into the extruder and ensures uniform admixing of the ingredients within the extruder unit.

In the extruder unit the head pressure, i.e. the pressure at the discharge die, must be controlled in order to prevent premature crosslinking as well as foaming due to an increase in the melt temperature, thereby activating the crosslinking and the blowing agent. Generally the temperature in the extruder unit must be maintained at a range of from 125° to 160° C. In order to maintain this temperature range, the head pressure cannot be allowed to become too high. It has been found that the presence of carbon black in the resin admixture at the level required to impart electrical conductivity to the foam raises the head pressure in the extruder unit. It is also found that the molecular weight of the polyethylene and the ethylene copolymer forming the resin admixture has a direct influence on the head pressure; a higher molecular weight providing a higher melt viscosity which, in turn, raises the head pressure.

Based upon several trial runs using different compounding recipes for producing an electrically conductive foam, it has been determined that a head pressure in excess of 2500 psi at a flow rate of 500 pounds per hour will cause premature crosslinking which is evident by blistering of the foamed product; whereas a head pressure of 1000 psi at the same flow rate is too low since there is incomplete mixing of the components within the extruder unit. Accordingly, a head pressure of from 1300 to 2000 psi at a flow rate of 500 lbs./hr. should be maintained to avoid these problems and to provide an acceptable preform product in the form of a sheet or other desired profile.

It has also been found that when the amount of carbon black is below 10 parts per 100 parts of the resin, the surface resistivity required by the foam product of this invention cannot be achieved. The use of more than 25 parts by weight of carbon black per 100 parts by weight of the resin increases the melt viscosity and is not necessary to achieve the required electrical conductivity. Therefore, the content of conductive carbon black in the foam composition is controlled to be from about 12 to about 25 parts, preferably about 15 to 20 parts, per 100 parts of the resin.

The melt index of the resin in indicative of its molecular weight; the higher the melt index, the lower the molecular weight. In order to control the head pressure in the extruder unit it has been found that the polyethylene as well as the ethylene copolymer must each have a melt index within a selected range of melt indices.

The melt index of the low-density polyethylene is determined, in part, by the content of the conductive carbon black which acts are filler and in part, by the contents of the crosslinking and blowing agents which are temperature sensitive. If the melt index of the polyethylene is too low, e.g. less than 10, then the melt temperature will be raised due to an increase in the melt viscosity and an increase in the head pressure in the extruder unit. In such cases the foam will be blistered by localized crosslinking. If the melt index of the polyethylene is too high, e.g. greater than 40, the foam will collapse during activation of the blowing agent by heat. The expression "melt index of the low-density polyethylene" is used herein is intended to refer to an average melt index of all the polyethylene resin within the resin admixture. For example, a minor amount of a polyethylene with a melt index of 6 or less may be mixed with a major amount of a polyethylene having a melt index of 40 to provide an average melt index of 20, which would be acceptable. Generally, polyethylene resin having a melt index near the middle of the heretofore described range provides the most preferred resin for producing the foam of this invention. The same consideration applies to the selection of the ethylene copolymer.

A number of different conductive carbon blacks are suitable for the invention including channel black, furnace black, acetylene black or thermal black. Particular effective blacks are highly electrically conductive, non-reinforcing furnace-type carbon blacks which have sub-micron particle sizes and which are used for compounding with polymers. These preferred carbon blacks generally have an average particle size not greater than 30 millimicrons and an effective surface area greater than 900 $m^2/g$.

The electrically conductive foam of this invention as well as a continuous process for producing the foam will be further understood from the following detailed description and accompanying drawings wherein.

Figure 1:
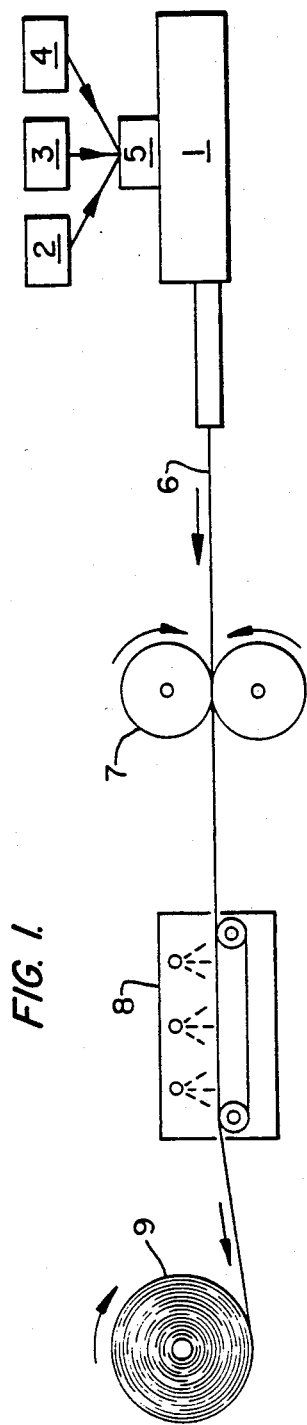
FIG. 1 is a schematic flow diagram illustrating formation of the non-crosslinked preform or major material by compounding of the foamable composition, extrusion of the composition, shaping of the extrudate and cooling of the extrudate.

FIG. 1 is a schematic view of the apparatus for producing a non-crosslinked formable preform or matrix sheet. Pellets of a concentrate of polyethylene containing conductive carbon black, pellets of polyethylene containing a crosslinking agent and pellets of polyethylene and/or ethylene/vinyl acetate copolymer containing a blowing agent are plasticized and mixed in a screw extruder and are thereafter extruded in the form of a sheet from the die head of the extruder unit 1. Metered amounts of the pellets containing the conductive carbon black, the blowing agent, the crosslinking agent and resin are, respectively, fed from hoppers 2, 3 and 4 into the feed hopper 5 of the extruder unit. The extrudate at a temperature on the order of 150° C. in the form of a sheet 6 is passed through the nip of a pair of pressure rollers 7 wherein the sheet is sized or calibrated to provide a preform or matrix material having a uniform thickness of from about ⅛ or ⅙ of an inch and thereafter the size preform sheet is passed through a cooling unit 8 wherein the sheet is cooled to room temperature by jets of a cooling fluid, e.g. air. The cool sheet is then rolled up on a take-up roll 9.

The rolled up sheet of foamable, non-crosslinked, matrix material is removed from the take-up roll and may be stored for one or more days until needed for the production of the electrically conductive foam. Also it will be understood that the sized and calibrated sheet may be immediately processed into a foam, if desired.

Figure 2:
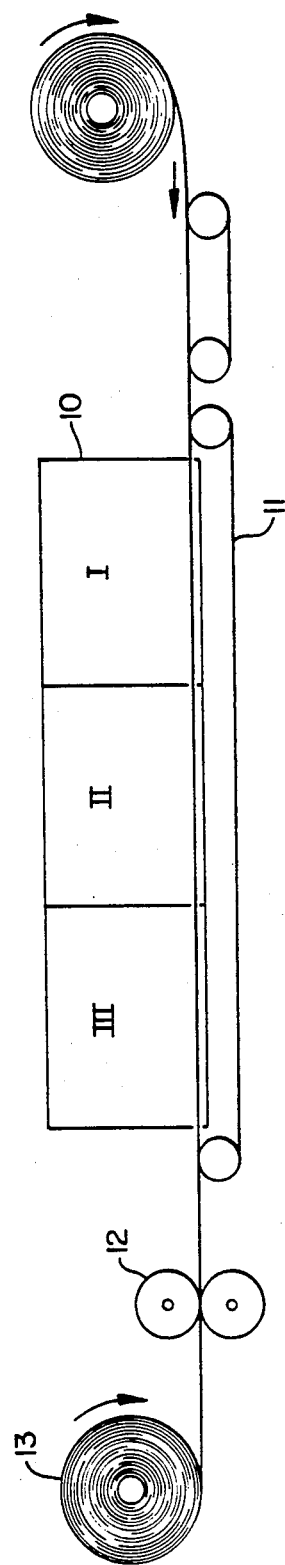
FIG. 2 is a schematic cross-sectional view of a multi-zone oven for heating a preform to produce a foam product in the form of a sheet.

In order to produce the unique foam product, the preform material is heated to temperatures required to activate the crosslinking agent and the blowing agent, preferably in succession, within a multi-zone oven 10 as shown in FIG. 2. The interior of the oven is divided into three zones by flexible wall curtains which are suspended vertically within the oven 10. An endless screen belt 11 transports the preform sheet 6 through the oven at a predetermined rate of travel to allow sufficient residence time in each zone to effect the necessary crosslinking and/or foaming. In zone I the preform is heated to a temperature high enough to activate the crosslinking agent without activating the blowing agent. In zone II, the temperature is increased to activate the blowing agent and to complete the crosslinking reactions. Then in zone III of the oven the temperature is further increased to complete the formation of the foam which has a uniform closed cell structure and a thickness of from ¼ to ⅜ of an inch or more. It has been found that in the method of the present invention the matrix or preform material is expanded on the order of from 1.5 to 3 times its original thickness during the foaming operation.

The foam is then cooled by water-filled chrome rolls in the cooling unit 12 to provide a foam product which is very flexible and which can be easily stored by being rolled up on a take-up roll 13 as shown in FIG. 2.

Figure 3:
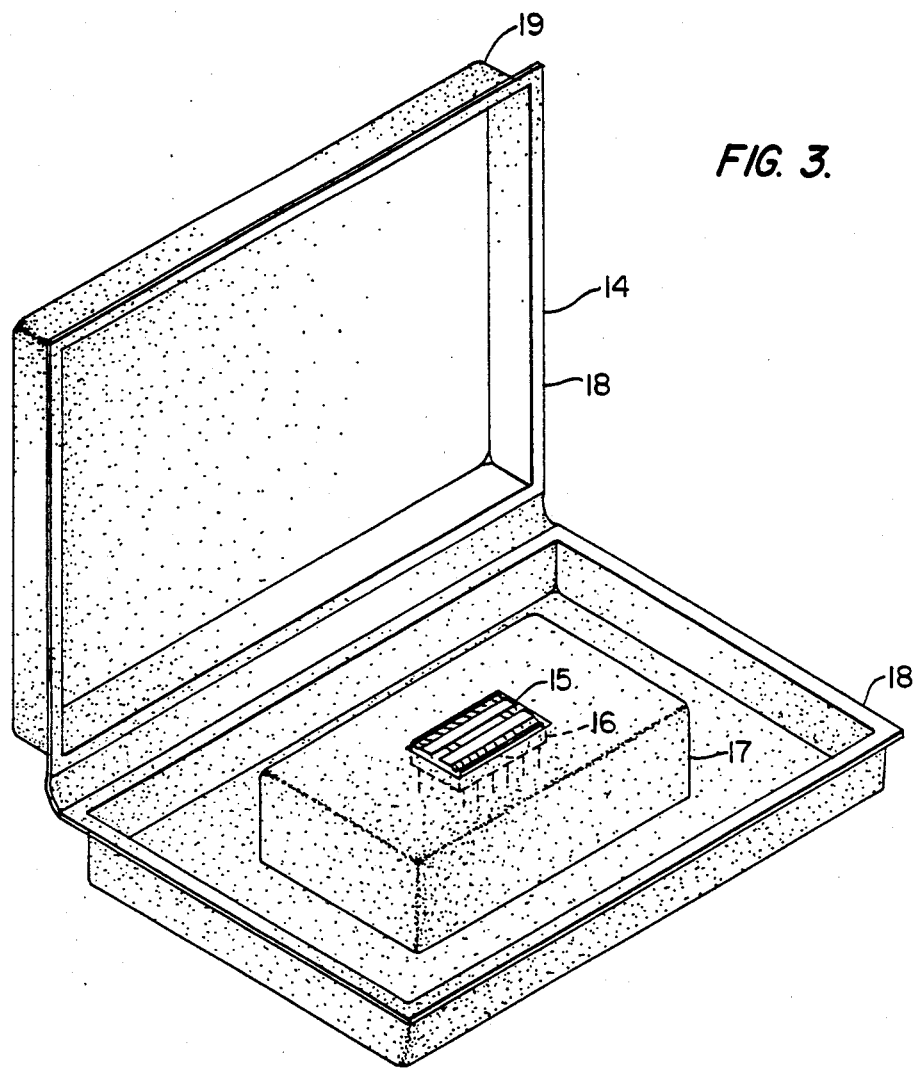
FIG. 3 is a perspective view of a shaped article, namely a package made of the crosslinked electrically conductive polyethylene foam that provides Faraday Cage Protection For an electronic device.

Advantageously, it has been found that the foam products of this invention can be fabricated into complex shaped articles by vacuum forming wherein a panel of the foam material is draped over a female or male mold which may be heated to a forming temperature of from 265° to 320° F. One embodiment such as a shaped article is shown in FIG. 3 wherein a suitable package 14 provides Faraday Cage Protection For an electronic device 15 positioned in a recess or pocket 16 located in the center portion 17 of the package. The center portion 17 is raised above the edges 18 of the package. When the lid portion 19 is closed the electronic device 15 is completely encased within an electrically conductive shield. The edges 18 may be sealed by adhesive cement or by an adhesive tape strip or one edge may be formed with a tab that engages the other edge.

The electrically conductive foam product of this invention and the method for forming the product are further described by reference to the following examples wherein several foam recipes were evaluated using various amounts of resin, crosslinking agent, and blowing agent, all parts and percentages are by weight unless otherwise indicated.

REFERENCE EXAMPLES 1-5

Using an apparatus of the type illustrated in FIG. 1 pellets of a concentrate containing polyethylene and conductive carbon black, and pellets of polyethylene and/or ethylene/vinyl acetate copolymer containing conductive carbon black, azodicarbonamide (a blowing agent) or dicumylperoxide (a crosslinking agent) were admixed within the extruder unit 1 and extruded at a temperature on the order of 140°-160° C. In some cases, additional pellets consisting entirely of resin, that is polyethylene and/or ethylene/vinyl acetate copolymer were also added to the extruder unit from another hopper (not shown). The resulting extrudate is calendered to form a sheet having a thickness of from 1/16" to ¼". Samples of the sheet are heated in an oven which is heated step-wise to provide three distinct temperature levels within the oven in order to duplicate passage through a multi-zone oven as illustrated in FIG. 2. The first level or zone I had a temperature of 180° C.; a second or zone II had a temperature of 200° C.; and a third level or zone III had a temperature of 220° C.

TABLE 1

|  | Example No. | | | | |
| --- | --- | --- | --- | --- | --- |
|  | Ref. Ex. 1 | Ref. Ex. 2 | Ref. Ex. 3 | Ref. Ex. 4 | Ref. Ex. 5 |
| Polyethylene MI 2.0 | 39.3 | 19.2 | 20.0 | 18.1 | 18.1 |
| MI 20.0 | 60.7 | — | — | — | 14.7 |
| Ethylene/Vinyl Acetate (VA) 9% VA, MI 8.0 | — | 61.5 | 73.9 | 73.4 | 58.8 |
| 18% VA, MI 8.0 | — | — | — | — | — |
| 18% VA, MI 2.5 | — | 19.3 | 6.1 | 8.5 | 8.4 |
| 22% VA, MI 23 | — | — | — | — | — |
| Conductive Black (Ketjenblack (EC) | 6.0 | 12.6 | 15.0 | 15.0 | 15.0 |
| Azodicarbonamide | 5.6 | 4.0 | 7.0 | 8.0 | 8.0 |
| Dicumyl peroxide | 1.2 | 1.25 | 1.25 | 1.02 | 1.02 |
| Total Parts by Weight | 112.8 | 117.85 | 123.25 | 124.02 | 124.02 |
| Surface conductivity ohms/sq. | $10^{15}$ | $<10^4$ | $<10^4$ | $<10^4$ | $<10^4$ |
| Foam density P.C.F. | 9.0 | 12.0 | 8.0 | 6.0 | 6.0 |

It will be observed from the tabulation of data provided in Table 1 that in Reference Example 1 the foam had a density of 9 P.C.F., but it was not conductive. Also, the foam was brittle and had a blistered surface. In Reference Example 2, the loading of conductive black was increased and the foam produced from this run was conductive and not brittle, but it had a density of 12 pounds per cubic foot which is greater than the desired density of 6 pounds per cubic foot. Also this foam produced a very high head pressure of 2800 psi on a laboratory extruder having an extruder screw with a 2 inch diameter and at a rate of 60 pounds per hour.

In Reference Example 3, using a higher level of blowing agent, it was possible to reduce the density of the foam. However, it was found that this formulation also provided a high head pressure on the laboratory extruder and it was not possible to produce a foam with a density of 6 pounds per cubic foot. In the fourth run, (Reference Example 4) a formulation was employed which has a reduced level of crosslinking agent and a slightly higher level of blowing agent and it was found that this formulation produced a blister-free foam that is conductive and had a density of 6 pounds per cubic foot. Head pressure during this extrusion on the laboratory extruder was still too high, that is on the order of 2800 psi.

In the Reference Example 5, a formulation was employed using a blend of the ethylene/vinyl acetate copolymer and conductive black concentrate and a low density polyethylene-conductive black concentrate. It was found that in this run the head pressure in the laboratory extruder dropped to 2100 psi. However, the head pressure of 2100 psi in the laboratory extruder showed that this formulation would not be suitable for a production extruder wherein the extrudate is formed at a rate of 500 pounds per hour.

EXAMPLES 1-6

In these examples, additional runs were conducted using the laboratory extruder having a two inch extruder screw as used in the reference examples and runs were conducted using a production extruder having a six inch screw extruder. The formulations used and the results obtained are tabulated in Table 2 below.

In Example 1 in order to reduce the head pressure when using a concentrate containing the ethylene/vinyl acetate copolymer and conductive carbon black, a crosslinking concentrate was prepared using a 20 melt index low density polyethylene resin. Advantageously it was found that this formulation when extruded lowered the head pressure to 2100 psi. However, since it is necessary during production extrusion levels to have head pressures no more than 2000 psi, this formulation was considered to be marginal and not acceptable for production extrusion rates.

In Example 2 a new blowing agent concentrate was used employing a 20 melt index low-density polyethylene and an 8 melt index ethylene vinyl acetate copolymer. This formulation was extruded and found to have a lower head pressure of 1700 psi in the laboratory extruder. It appeared to provide a formulation which would be suitable for use in a production large scale extruder.

However, as shown in Table 2 it was found that using the same formulation in Example 3 using a the six inch extruder at a rate of 500 lbs/hr. caused very high amperage loadings and during the run the head pressure increased steadily. After approximately one and three-quarter hours, it was necessary to terminate the run because the amperage load on the extruder drive was at the maximum and the head pressure was on the order of 2800 psi. The foam produced during the initial portion of the trial was found to be satisfactory although the cell size was larger than the laboratory extruder trials. At the end of the run just prior to termination, the foam was blistered.

In Example 4 a new conductive black concentrate was prepared using an ethylene/vinyl acetate copolymer containing 22% by weight of vinyl acetate and blending it equally with a 20 melt index low density polyethylene. The head pressure achieved in this run was on the order of 1500 psi and the foam had extremely good appearance and excellent electrical conductivity.

In Example 5 and in Example 6, additional formulations for producing a foam in the production scale extruder were prepared and were evaluated. It will be seen from Table 2 that the unique results of the present invention are achieved when resins having a higher melt index, that is on the order of from 15 to 25, are used in place of resins having a lower melt index.

TABLE 2

| | Example No. | | | | | |
|---|---|---|---|---|---|---|
| | Ex. 1 | Ex. 2 | Ex. 3 | Ex. 4 | Ex. 5 | Ex. 6 |
| Polyethylene MI 2.0 | 4.8 | — | — | — | — | — |
| MI 20.0 | 12.6 | 16.9 | 16.9 | 54.8 | 61.3 | 61.3 |
| Ethylene/Vinyl Acetate (VA) 9% VA, MI 8.0 | 73.8 | 74.2 | 74.2 | — | — | — |
| 18% VA, MI 8.0 | — | 8.9 | 8.9 | 8.6 | 3.4 | 3.48 |
| 18% VA, MI 2.5 | 8.7 | — | — | — | — | — |
| 22% VA, MI 23 | — | — | — | 36.6 | 35.3 | 35.3 |
| Conductive Black (Ketjenblack (EC) | 15.0 | 15.0 | 15.0 | 15.0 | 14.0 | 14.0 |
| Azodicarbonamide | 8.0 | 8.0 | 8.0 | 8.0 | 5.0 | 4.2 |
| Dicumyl peroxide | 0.95 | 0.90 | 0.90 | 1.0 | 1.0 | 1.0 |
| Total Parts by Weight | 123.85 | 123.9 | 123.9 | 124.0 | 120.0 | 119.08 |
| Surface conductivity ohms/sq. | $<10^4$ | $<10^4$ | $<10^4$ | $<10^4$ | $<10^4$ | $<10^4$ |
| Foam density P.C.F. | 6.0 | 6.0 | 6.0 | 6.0 | 9.0 | 12.0 |

EXAMPLE 7

In this example a panel of the foam product obtained in Example 4 having dimensions of 9"×12" was formed into a electrically conductive package as shown in FIG. 3 by using a female type vacuum molding device at a temperature of 300° F.

Advantageously it was found that this foam product exhibited excellent uniformity in the surface resistivity with the variation of no more than 15% over the surfaces of the article. In all cases the surface resistivity was less than $1 \times 10^4$ for ohms/square.

EXAMPLE 8

In this example, an additional run was conducted using the laboratory extruder previously used in Example 1 to produce a foamable preform from a formulation containing 100% of polyethylene (P.E.): the formulation of the admixture formed into the preform is as follows:

| | 100% Polyethylene Foam |
|---|---|
| P.E. Resin M.I. 20 | 100.00 |
| Dicumyl Peroxide | 1.0 |
| Azodicarbonamide | 7.0 |
| Ketjenblack-EC | 15.0 |
| Total Parts by Weight | 123.0 |
| Foam Density | 9.0 P.C.F. |

From an evaluation of the foam obtained from the preform, it was found that the product was an extremely brittle matrix which would be very difficult to work with in a production process. This matrix had a density of 9 P.C.F. At this density, the foam product may be used in a table mat application or the like.

EXAMPLE 9

In this example, an additional run was conducted using the laboratory extruder previously used in Example 1 to produce a foamable preform from a formulation containing a resin made up of 100% of an ethylene/vinylacetate copolymer. The formulation in this run is as follows:

| | 100% EVA Foam |
|---|---|
| EVA (9% VA) M.I. 7.0 | 100.00 |
| Dicumyl Peroxide | 1.0 |
| Azodicarbonamide | 7.0 |
| Ketjenblack-EC | 15.0 |
| Total Parts by Weight | 123.0 |
| Foam Density | 6.0 P.C.F. |

An evaluation of the foam product obtained from the resulting preform showed that the foam had a density of 6 P.C.F. However, it was determined during the processing of this formulation that a formulation containing a blend of polyethylene and ethylene/vinylacetate copolymer molds much better than a formulation employing the copolymer alone.

It will be understood that in accordance with the present invention it is much preferred to use an admixture of low density polyethylene and ethylene copolymer to produce an electrically conductive ethylene polymer foam since this admixture has significantly greater workability during the extruding and cooling operations and provides a more flexible and useful product, especially in terms of moldability of the foamable preform. Also, it should be recognized that the density of the foam products may be more than 12 P.C.F. depending upon the intended application and a density up to 30 P.C.F. may be obtained.

What is claim is:

1. A method for producing an electrically conductive crosslinked polyethylene foam sheet having a closed cell foam structure and exibiting a surface resistivity of not more than $10^5$ ohms/square, which comprises extruding a resinous composition containing per 100 parts by weight of a mixture containing about 100-0% by weight of polyethylene and about 100-0% by weight of an ethylene copolymer, 12 to 20 parts by weight of conductive carbon black, 2 to 15 parts by weight of a chemical blowing agent and 0.1 to 1.5 parts by weight of a crosslinking agent, said polyethylene having a melt index of about 10-40 and the ethylene copolymer having a melt index of about 10-40, to produce a non-crosslinked, non-foamed sheet preform at a temperature above the melt temperature of the resinous composition and below the decomposition temperatures of the crosslinking agent and the blowing agent, and then heating the sheet preform to higher temperatures than the extrusion temperature to activate the crosslinking agent and the blowing agent to thereby effect crosslinking and foaming of the composition.

2. A method for producing an electrically conductive crosslinked polyethylene foam sheet according to claim 1, wherein said resinous compostion consists essentially of, per 100 parts by weight of a mixture consisting essentially of about 20-80% by weight of polyethylene and about 80-20% by weight of the ethylene copolymer, 12 to 20 parts by weight of conductive carbon black, 0.1 to 1.5 by weight of the crosslinking agent and 2 to 15 parts by weight the chemical blowing agent.

3. A method for producing an electrically conductive crosslinked polyethylene foam strut according to claim 2, wherein the ethylene copolymer is a copolymer prepared from a monomeric mixture containing at least 60% by weight of ethylene and at least 5% by weight of an ethylenically unsaturated monomer copolymerizable with ethylene and capable of providing a copolymer that increases the flexibility of the polyethylene.

4. A method for producing an electrically conductive crosslinked polyethylene foam, sheet according to claim 2, wherein the ethylene copolymer is a copolymer prepared from a monomeric mixture containing at least 60% by weight of ethylene and 5–40% by weight of vinyl acetate.

5. A method for producing an electrically conductive crosslinked polyethylene foam sheet according to claim 2, wherein the polyethylene has a melt index of from 15 to 30 and the ethylene copolymer has a melt index of from 20 to 25.

6. A method for producing an electrically conductive crosslinked polyethylene foam sheet according to claim 1, wherein the resinous composition is extruded at a temperature of from 125° C. to 160° C. and the sheet preform is heated in a step-wise manner wherein each successive step has a higher temperature.

7. A method for producing an electrically conductive polyethylene foam sheet according to claim 6, wherein the sheet preform is heated in a multi-zone oven divided into three zones, the first zone having a temperature of from 175° to 200° C., and the third zone having a temperature of from 220° to 240° C.

8. A method for producing an electrically conductive crosslinked polyethylene foam sheet according to claim 1, wherein the resinous composition is extruded from an extruder unit to form the sheet preform and said sheet preform, upon being heated to higher temperatures than the extrusion temperature, forms a sheet having a thickness of from $\frac{1}{4}$ to $\frac{3}{8}$ of an inch.

9. A method for producing an electrically conductive crosslinked polyethylene foam sheet according to claim 1 further comprising preparing said resinous composition by premixing the conductive carbon black, the crosslinking agent and the blowing agent with a portion of the polyethylene and/or the ethylene copolymer to form pellets and thereafter admixing the pellets with additional polyethylene and/or ethylene copolymer within the extruder unit.

10. A method for producing an electrically conductive crosslinked polyethylene foam sheet according to claim 1 wherein the resinous composition is extruded from an extruder unit, the head pressure of the extruded unit being maintained from 1300 to 2000 psi at a flow rate of the resinous composition of 500 pounds per hour.

* * * * *